(12) United States Patent
Clewis et al.

(10) Patent No.: US 7,263,694 B2
(45) Date of Patent: *Aug. 28, 2007

(54) DIRECTED NON-CYCLIC GRAPH WALKING SYSTEM FOR DATA PROCESSING AND ANALYSIS IN SOFTWARE APPLICATION

(75) Inventors: Fred T. Clewis, Stanley, NC (US); Richard A. Sitze, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 499 days.

This patent is subject to a terminal disclaimer.

(21) Appl. No.: 10/038,136

(22) Filed: Oct. 26, 2001

(65) Prior Publication Data

US 2003/0084061 A1 May 1, 2003

(51) Int. Cl.
G06F 9/45 (2006.01)
G06F 9/44 (2006.01)

(52) U.S. Cl. ........................ 717/156; 717/102; 717/138
(58) Field of Classification Search ................ 717/138, 717/145–161, 102; 707/5, 102, 203; 709/225; 704/244, 254
See application file for complete search history.

(56) References Cited

U.S. PATENT DOCUMENTS

| | | | |
|---|---|---|---|
| 4,782,444 A | * | 11/1988 | Munshi et al. ............... 717/153 |
| 5,379,422 A | | 1/1995 | Antoshenkov |
| 5,386,394 A | | 1/1995 | Kawahara et al. |
| 5,423,040 A | * | 6/1995 | Epstein et al. ............... 718/102 |
| 5,606,698 A | * | 2/1997 | Powell ........................ 717/161 |
| 5,671,419 A | * | 9/1997 | Carini et al. ................. 717/145 |
| 5,761,667 A | | 6/1998 | Koeppen |

(Continued)

FOREIGN PATENT DOCUMENTS

WO    WO99/08170    2/1999

OTHER PUBLICATIONS

Fetterer et al., A performance analysis of hierarchical shortest path algorithms, Tools with Artificial Intelligence, 1997. Proceedings., Ninth IEEE International Conference on , Nov. 3-8, 1997, pp. 84-93.*

(Continued)

*Primary Examiner*—Wei Zhen
*Assistant Examiner*—Satish S. Rampuria
(74) *Attorney, Agent, or Firm*—James D. Palmer; Hoffman, Warnick & D'Alessandro LLC

(57) ABSTRACT

A system and method for efficiently walking a directed non-cyclic graph of hierarchical data using multiple analysis tools. The graph walking system comprises: a system for binding a plurality of graph observers to a graph, wherein each graph observer is further bound to a set of node patterns and a set of node observers; graph walking logic for systematically walking through nodes within the graph, wherein the graph walking logic can be instructed by a first pruning system not to walk a set of sub-nodes of an encountered node; and a second pruning system that can be instructed by a node observer bound with an associated graph observer to deactivate the associated graph observer until the set of sub-nodes for the encountered node has been walked. The first pruning system will cause the set of sub-nodes not to be walked only if all of the plurality of graph observers have been deactivated.

20 Claims, 4 Drawing Sheets

U.S. PATENT DOCUMENTS

| | | | |
|---|---|---|---|
| 5,836,014 A * | 11/1998 | Faiman, Jr. | 717/156 |
| 5,838,977 A * | 11/1998 | Gupta | 717/156 |
| 5,867,711 A * | 2/1999 | Subramanian et al. | 717/161 |
| 5,873,081 A * | 2/1999 | Harel | 707/3 |
| 5,877,775 A | 3/1999 | Theisen et al. | |
| 5,887,174 A * | 3/1999 | Simons et al. | 717/161 |
| 6,055,539 A * | 4/2000 | Singh et al. | 707/102 |
| 6,064,819 A * | 5/2000 | Franssen et al. | 717/156 |
| 6,092,044 A * | 7/2000 | Baker et al. | 704/254 |
| 6,212,498 B1 * | 4/2001 | Sherwood et al. | 704/244 |
| 6,292,938 B1 * | 9/2001 | Sarkar et al. | 717/138 |
| 6,381,735 B1 * | 4/2002 | Hunt | 717/158 |
| 6,654,761 B2 * | 11/2003 | Tenev et al. | 707/102 |
| 6,681,221 B1 * | 1/2004 | Jacobs | 707/5 |
| 6,741,242 B1 * | 5/2004 | Itoh et al. | 345/419 |
| 6,741,255 B1 * | 5/2004 | Furlani et al. | 345/537 |
| 6,745,384 B1 * | 6/2004 | Biggerstaff | 717/156 |
| 6,957,422 B2 * | 10/2005 | Hunt | 717/130 |
| 2001/0042062 A1 * | 11/2001 | Tenev et al. | 707/3 |
| 2002/0162096 A1 * | 10/2002 | Robison | 717/145 |
| 2003/0135619 A1 * | 7/2003 | Wilding et al. | 709/225 |
| 2005/0193037 A1 * | 9/2005 | Adiba et al. | 707/203 |

OTHER PUBLICATIONS

Dell et al., An object oriented data model for Web and its algebra, Technology of Object-Oriented Languages and Systems, 1999. TOOLS 31. Proceedings, Sept. 22-25, 1999, pp. 83-88.*

Chew et al., An object-oriented OSI event and log manager, Networks, 1995. Theme: 'Electrotechnology 2000: Communications and Networks'. International Conference on Information Engineering., Proceedings of IEEE, Jul. 1995, pp. 256-260.*

Kramer et al., The combining DAG: a technique for parallel data flow analysis, Parallel and Distributed Systems, IEEE Transactions on, vol. 5, Issue: 8, Aug. 1994, pp. 805-813.*

On the granularity and clustering of directed acyclic task graphs Gerasoulis, A.; Yang, T. Parallel and Distributed Systems, IEEE Transactions on vol. 4 Issue: 6 Jun. 1993, pp. 686-701.*

Analysis, evaluation, and comparison of algorithms for scheduling task graphs on parallel processors Ahmad, I.; Yu-Kwong Kwok; Min-You Wu Parallel Architectures, Algorithms, and Networks, 1996. Proceedings. Second International Symposium on Jun. 12-14, 1996, pp. 207-213.*

Symbolic partitioning and scheduling of parameterized task graphs Cosnard, M.; Jeannot, E.; Tao Yang Parallel and Distributed Systems, 1998. Proceedings., 1998 International Conference on Dec. 14-16, 1998, pp. 428-434.*

Runtime parallel incremental scheduling of DAGs Min-You Wu; Wei Shu; Yong Chen Parallel Processing, 2000. Proceedings. 2000 International Conference on 2000, pp. 541-548.*

Gamma, Helm, Johnson and Vlissides, "Design Patterns—Elements of Reusable Object-Oriented Software," ISBN 0-201-63361-2, pp. 293-303, 1995.

* cited by examiner

US 7,263,694 B2

DIRECTED NON-CYCLIC GRAPH WALKING SYSTEM FOR DATA PROCESSING AND ANALYSIS IN SOFTWARE APPLICATION

BACKGROUND OF THE INVENTION

1. Technical Field

The present invention relates generally to analyzing and processing hierarchical data structured in directed non-cyclic graphs, and more particularly relates to a system and method for providing an optimized parallel analysis of such hierarchical data. This includes directed graph representations of tree's and other non-cyclic graphs.

2. Related Art

The collection, processing, and analysis of electronic information have become critical tools in today's business methodologies. For instance, businesses recognize the importance of leveraging electronic information in order to more efficiently deliver goods and services to consumers. Analysis of such information might provide important business intelligence, reveal consumer interests, and determine marketplace trends.

However, as the amount of electronic information that is generated continues to grow, the ability to effectively and efficiently analyze the information becomes more challenging. Specifically, there is a significant time and cost factor involved in analyzing and processing large databases of information (i.e., data mining). For many large institutions, it may take on the order of hours to analyze or "walk through" a database of electronic information. The problem is further exacerbated when different processing or analysis tools must be run on the same set of data. In this case, the time and cost factor is multiplied by the number of required tools.

One method for handling large databases is to store, or arrange the information in a hierarchy. Directed non-cyclic graphs, are comprised of nodes arranged in a hierarchical fashion, with the more general information stored at the top, and more specific information branched off below, terminating in leaf nodes. Leaf nodes do not have children (directed lines from the leaf node to another node). In some cases information stored at the lower levels of the hierarchy may be referenced by multiple nodes higher in the graph, representing multiple references to common, or shared, information. Since the graph is non-cyclic, there is never a path from any given node that arrives back at that same node. Therefore a strict hierarchy of data is maintained. Note that a tree is a common degenerative form of a directed non-cyclic graph.

U.S. Pat. No. 6,055,539, entitled METHOD TO REDUCE I/O FOR HIERARCHICAL DATA PARTITIONING METHODS, issued on Apr. 25, 2000, which is hereby incorporated by reference, describes a method for classifying hierarchical data to allow for more efficient processing of a data set.

While data hierarchies and related methods for storing data have improved the process of analyzing large databases, the prior art has failed to adequately solve the problem of efficiently performing multiple processes or applying multiple tools to a set of hierarchical data. For example, a straightforward recursive descent walk of a hierarchical data tree of N nodes by M analysis routines would require N*M visits to the individual nodes. As is evident, a more efficient mechanism for handling this situation is required.

"Design Patterns—Elements of Reusable Object-Oriented Software," by Gamma, Helm, Johnson, and Vlissides (ISBN 0-201-63361-2), pages 293-303, copyright 1995, which is hereby incorporated by reference, describes an 'Observer', or 'PublishSubscribe' design pattern. While not directly applicable to a static directed graph, the mechanism describes an 'event drive' model for processing data that has been used to allow multiple analysis routines access to the hierarchical data. Such algorithms are frequently used in the processing of XML, for example the Simple API for XML (SAX) uses this event driven model. However, this disclosure fails to provide efficient optimization techniques for handling such data.

SUMMARY OF THE INVENTION

The present invention solves the above-mentioned problems, as well as others, by providing a system and method that allow multiple analysis tools to process a directed non-cyclic graph in parallel, and efficiently "prune" or eliminate the processing of unnecessary data. In a first aspect, the invention provides a graph walking system, comprising: a binding system for binding a graph observer with a graph, for binding node patterns to node observers to generate at least one node pairing, and for binding the graph observer to at least one node pattern-node observer pairing; graph walking logic for systematically walking through nodes within the graph; a pattern testing system for determining if an encountered node matches one of the node patterns; an event manager for generating encountered and completed events when one of the node observers is bound to a matching node pattern; and a pruning system that can deactivate the graph observer with respect to sub-nodes of the encountered node if a bound node observer determines that there is no interest in the sub-nodes.

In a second aspect, the invention provides a system for analyzing a directed non-cyclic graph of hierarchical data, comprising: a system for binding a plurality of graph observers to a graph, wherein each graph observer is further bound to a set of node patterns and a set of node observers; graph walking logic for systematically walking through nodes within the graph; a first pruning system that can be instructed by a node observer bound with an associated graph observer to deactivate the associated graph observer until a set of sub-nodes for the encountered node has been walked; and a second pruning system that can instruct the graph walking logic not to walk the set of sub-nodes for the encountered node.

In a third aspect, the invention provides a method for analyzing a directed non-cyclic graph of hierarchical data, comprising the steps of: binding a plurality of graph observers to a graph, wherein each graph observer is further bound to a set of node patterns and a set of node observers; systematically walking through nodes within the graph; generating an encounter event and handling the encounter event with a bound node observer when one of the node patterns matches an encountered node; deactivating the graph observer associated with the bound node observer if the bound node observer determines that a set of sub-nodes of the encountered node should be pruned; and bypassing the walking of the set of sub-nodes if all of the plurality of graph observers have been deactivated.

In a fourth aspect, the invention provides a program product stored on a recordable medium, which when executed, analyzes a directed non-cyclic graph of hierarchical data, the program product comprising: program code configured to bind a plurality of graph observers to a graph, wherein each graph observer is further bound to a set of node patterns and a set of node observers; program code configured to provide graph walking logic for systematically walking through nodes within the graph; program code configured to provide a first pruning system that can be instructed by a node observer bound with an associated graph observer to deactivate the associated graph observer until a set of sub-nodes for an encountered node has been walked; and program code configured to provide a second pruning system that can instruct the graph walking logic not to walk the set of sub-nodes for the encountered node.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF THE INVENTION

Figure 1:
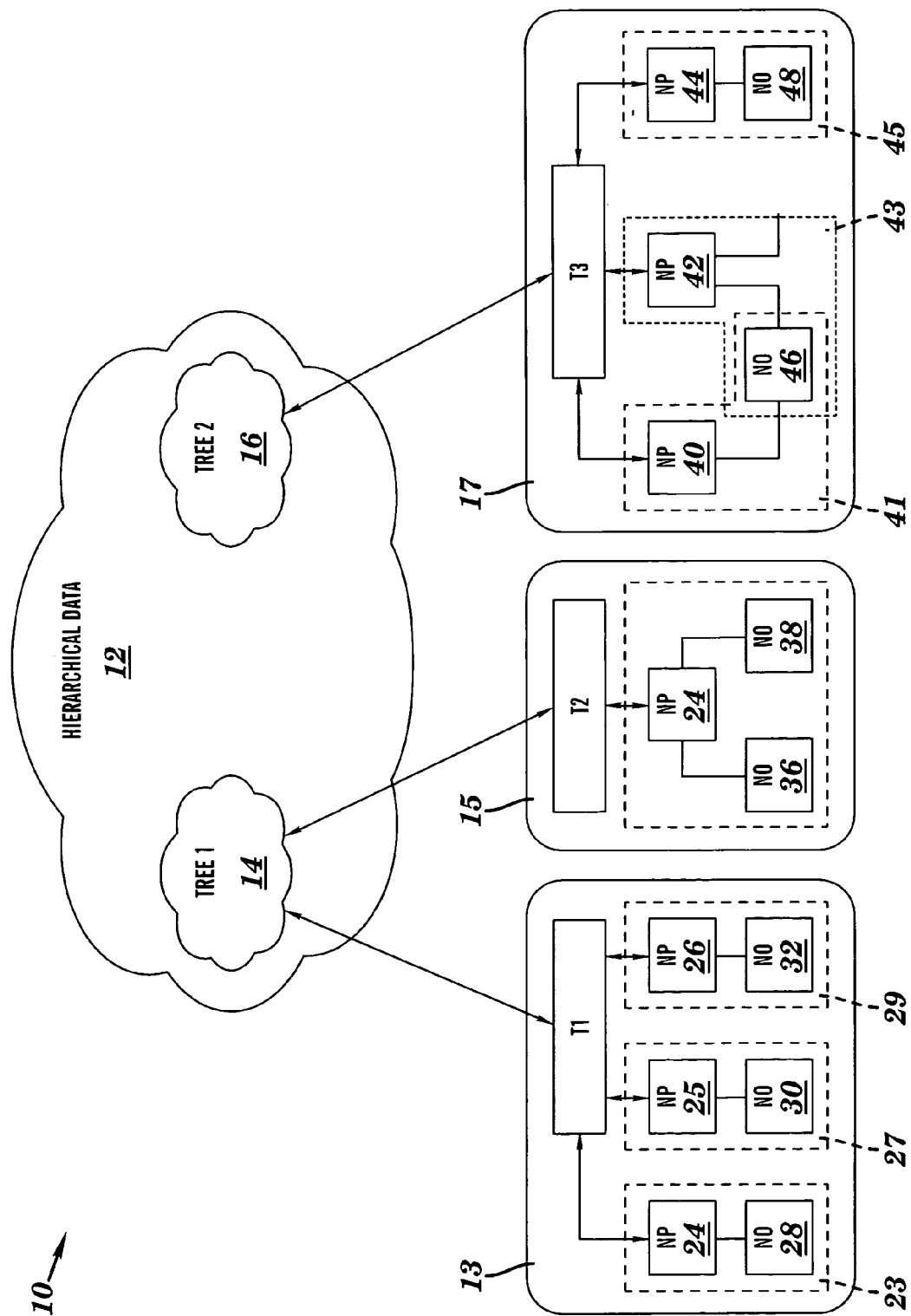
FIG. 1 depicts a block diagram of an exemplary graph observer architecture in accordance with the present invention.

Referring now to the figures, FIG. 1 depicts an exemplary graph walking architecture 10 in accordance with the present invention that allows multiple analysis tools to efficiently operate on hierarchical data 12 in a parallel manner. As shown, hierarchical data 12 comprises a first graph 14 and a second graph 16 (i.e., tree 1 and tree 2). Each graph is composed of a hierarchy of nodes, and each graph may be a subgraph of some larger graph. Bound to the first graph 14 are two graph observers T1 and T2. Bound to the second graph 16 is a third graph observer T3. Each graph observer embodies a method of analyzing/processing the information in the graph to which it is bound (i.e., it provides an analysis tool). The process of actually walking through a graph is handled by a graph walker, or graph walking logic, which systematically guides the processing of nodes within the graph. As each graph is walked, the bound graph observers look for matching node patterns, which will in turn cause one or more node observers to analyze or process the particular node. Although this invention is directed to non-cyclic directed graphs, it should be understood that the invention could be extended to cover a cyclic graph, using techniques known to those skilled in the art.

Exemplary node patterns might include named or unnamed node attributes, or node types. A simple node pattern identifies distinguishing node attributes (i.e. names and/or types) of a single node by specifying attribute-patterns for each attribute of a node. An attribute-pattern name might be "exact match", "phonetic match" (e.g., a soundex algorithm), or a regular expression (i.e., wild-card) match. For example, a simple node pattern could specify match "fred" for the name attribute, and match-any for all other attributes of a node.

As can be seen, each graph observer T1, T2 and T3 is bound to one or more sets or "pairings" (shown within dotted lines) of node patterns (NP) and node observers (NO). Within each pairing, one or more node patterns are bound to one or more node observers. Thus, for example, graph observer T1 is shown bound to: a first pairing 23 comprised of node pattern 24 and node observer 28; a second pairing 27 comprised of node pattern 25 and node observer 30; and a third pairing 29 comprised of node pattern 26 and node observer 32. Graph observer T2 is similarly bound to a pairing comprised of node pattern 24 and node observers 36 and 38. Note that two instances of the same node pattern may exist. For example, graph observers T1 and T2 both have pairings that use node pattern 24. Graph observer T3, which is bound to the second graph 16, is bound to three pairings 41, 43, and 45. Pairing 41 comprises node pattern 40 and node observer 46. Pairing 43 comprises node pattern 42 and node observer 46. Pairing 45 comprises node pattern 44 and node observer 48. Note that a single instance of node observer 46 is shared by different pairings 41 and 43. Accordingly, unique groupings of graph, graph observer, node pattern(s) and node observer(s) are created, which may be referred to herein as graph/graph observer sets. It should be understood that the number and arrangement of graphs, graph observers, node patterns, and node observers shown in FIG. 1 are for exemplary purposes only.

Because of the binding between graph observers and node observers, graph observers T1 and T2 are able to efficiently process graph 14 in a parallel manner. As will be described in further detail below, the graph walking process is made more efficient based on information discerned by the node observers. In particular, the node observers can cause their respective graph observers to become inactive while sub-nodes are being walked (a first pruning system), and in certain cases cause the walking of sub-nodes to be skipped entirely (a second pruning system). These two pruning mechanisms greatly enhance the efficiency of the graph walking system of the present invention, particularly in the case where multiple graph observers (i.e., analysis tools) operate on a single graph.

Although the exemplary embodiments described herein are directed at optimizing the walking of hierarchical data graphs, it should be appreciated that the techniques, systems and methods described herein could be readily applied to any type of "directed graph." Directed graphs describe directed relationships (e.g., edges and lines) between entities (e.g., nodes).

Figure 2:
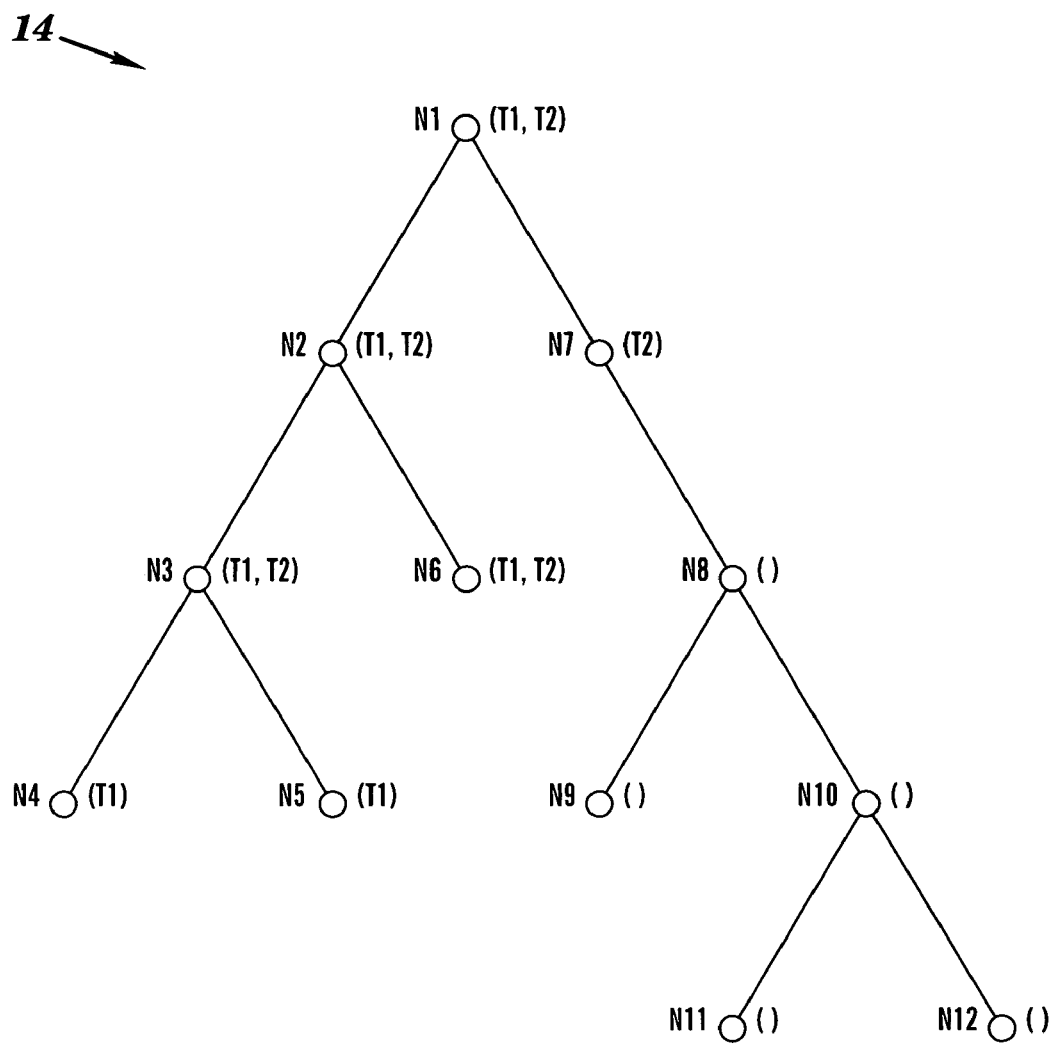
FIG. 2 depicts an exemplary directed non-cyclic graph, in this case a tree.

Referring now to FIG. 2, exemplary graph 14 is shown in greater detail. Specifically, graph 14 is shown comprised of twelve nodes N1, N2, N3, ... N12 arranged in a hierarchical manner. Assuming a straightforward recursive descent walk of the graph 14, node N1 would be processed first, followed by node N2, etc., until node N12. To illustrate how the invention might operate, each node is shown with parentheses listing the graph observers that are activate when the node is encountered by the graph walking logic. As noted above, graph observers can be made inactive for the processing of the sub-nodes of the encountered node when a node observer determines that there is no interest in the sub-nodes. In this example, both graph observers T1 and T2 are active for processing of nodes N1, N2, N3, and N6. However, when node N3 was encountered, a determination was made to deactivate graph observer T2 for the processing of sub-nodes N4 and N5. Thus, only graph observer T1 remains active while nodes N4 and N5 are walked.

Furthermore, during the processing of node N1, it was determined to deactivate graph observer T1 for sub-nodes N7-N12 using a first pruning system (described below). Also, when node N7 is encountered, it was determined to deactivate graph observer T2 for sub-nodes N8-N12, again using the first pruning system. Moreover, in this situation, a second pruning system will cause the graph walking logic to entirely skip the walking of nodes N8-N12. It should be appreciated that graph 14, as well as the graph observers that are shown processing the nodes, are shown for exemplary purposes only, and obviously a much more complex graph could be walked using this methodology.

Figure 3:
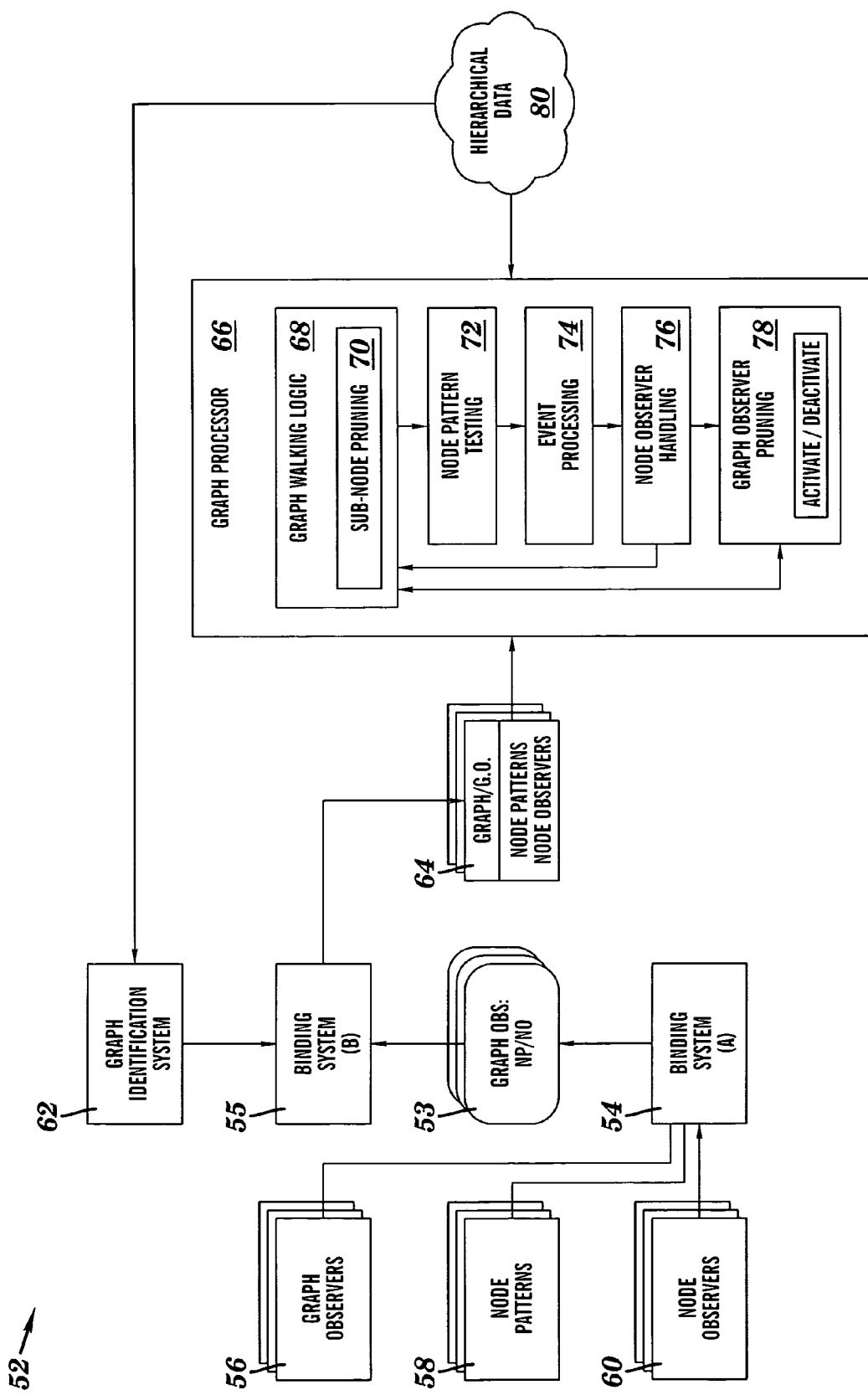
FIG. 3 depicts a block diagram of a graph walking system in accordance with a preferred embodiment of the present invention.

Referring now to FIG. 3, a graph walking system 52 is shown for operating on hierarchical data 80. Graph walking system 52 generally comprises a graph identification system 62, binding systems 54, 55 and a graph processor 66. Graph identification system 62 identifies graphs within the hierarchical data 80 that are to be processed. Each identified graph may be referred to as a root graph, or a subgraph of a root graph that is to be walked. It should be noted that multiple graphs may be identified for a single walking process.

Binding system (A) 54 receives the sets (i.e., zero or more) of graph observers 56, node patterns 58, and node observers 60. As shown in FIG. 1, each graph observer is bound to one or more pairings (i.e., bound sets of node patterns and node observers). Binding system 54 thus creates one or more "graph observer/(node pattern-node observer pairings)" groupings 53, such as groupings 13, 15 and 17 shown in FIG. 1. Each grouping 53 is then further bound to a graph (as identified by graph identification system 62) by binding system (B) 55. Note that a graph observer may be bound to more than one graph, and multiple graph observers may be bound to a single graph. The output is a set of graph/graph observer combinations 64 that each include one or more node pattern-node observer pairings. The graph/graph observer combinations 64 form the analysis tools that will facilitate the processing of hierarchical data 80 using graph processor 66.

During processing, graph processor 66 walks each graph separately and includes graph walking logic 68 that determines how the nodes within the graph will be walked (e.g., a left-right recursive descent). Graph walking logic 68 includes a sub-node pruning system 70 that can dynamically cause graph walking logic 68 to skip the walking of groups of sub-nodes. Specifically, sub-node pruning 70 will cause a set of sub-nodes not to be walked when all of the graph observers have been made inactive for the set of sub-nodes. The process for deactivating sets of sub-nodes is described in further detail below.

Graph processor 66 further includes a node pattern testing system 72 that determines if an encountered node matches any of the node patterns bound to the graph observers for the graph being walked. If a node pattern matches an encountered node of an active graph observer, an encountered event is generated for each node observer bound to the node pattern. Thus for example, referring back to FIG. 1, if graph observer T1 is active, and node pattern 24 matches an encountered node, then node observers 28 and 30 may each cause an encountered event to be generated. The process of generating events is handled by event processing system 74. In general, events are generated during a graph walk process when matching nodes are encountered, and when walks of subgraphs of nodes are completed. It should nonetheless be appreciated that event processing system 74 can also generate events for other occurrences that may be of interest.

When an encountered event is generated, node observer handling system 76 causes the registered node observer to handle the event. During the handling of the event, the node observer can notify graph observer pruning system 78 that processing of sub-nodes (if present) should proceed, or that the sub-nodes should be pruned. Specifically, graph observer pruning system 78 is provided to activate or deactivate graph observers associated with node observers that are handling such events. Thus, if a node observer determines that there is no interest in a set of sub-nodes, graph observer pruning system 78 will deactivate the graph observer associated with the node observer for the processing of the sub-nodes. If all of the graph observers are made inactive for a particular set of sub-nodes, then graph walking logic 68 will skip the walking of the set of sub-nodes (i.e., sub-node pruning 70 will be executed).

As each graph is walked, sub-nodes of each encountered node are processed in the same manner. Namely, if a sub-node of the current node matches a node pattern, or has any child at any depth that matches a node pattern bound to a node observer bound to an active graph observer, then the sub-node is processed in the same exact manner as described above.

When the walk of a set of sub-nodes of a node has been completed, any graph observers that were made inactive by the encountered event are reactivated, i.e., made active. Moreover, a completed event is generated for each node observer that received an encountered event and which indicated that the sub-nodes should be walked (i.e., its graph observer remained active). In addition to the features described above, a completed event may notify the graph walking logic 68 that the sub-nodes must be walked again.

The process of handling multiple nodes observers that are registered to a matching node pattern may be accomplished as follows. Consider a graph-observer T with node-observers NO1, NO2, NO3, and NO4. For some node N all four observers are determined to "match" the node's pattern. The order in which the node observers are triggered for "encountered" events is the order in which they are registered as node-observers. The order for "completed" events is the reverse of the order in which they are registered. For this example, the order of registration is NO1, NO2, NO3, and NO4. Within a set of node observers all belonging to the same graph observer (T), the node observers are notified of an event sequentially (parallelism applies to node-observers from different graph-observers).

Thus, if NO1 is notified of an "encountered" event, and notifies the graph walker that processing of sub-nodes can proceed, NO2 is then notified, which notifies the graph walker that processing of sub-nodes can be proceed. NO3 is then notified, and for this example indicates to the graph walker that sub-nodes should be pruned. The graph observer T is placed into the inactive state, NO4 is not notified of any event, and events are not generated for any node observer that belongs to T for any sub-node of N. If there is only one graph observer, or if all other graph observers are also inactive, then the graph walker prunes the subgraph completely using sub-node pruning 70. If the subgraph was pruned, or when all other graph observers are done processing the subgraph, then T is marked active and the "completed" event is generated for node N as follows: NO4 is not notified of the "encountered" event, so it is not notified of the "completed" event. NO3 indicated that it had no further interested in that branch of the graph, so it is not notified. NO2 is notified of the completed event. Finally, NO1 is notified of the completed event.

Figure 4:
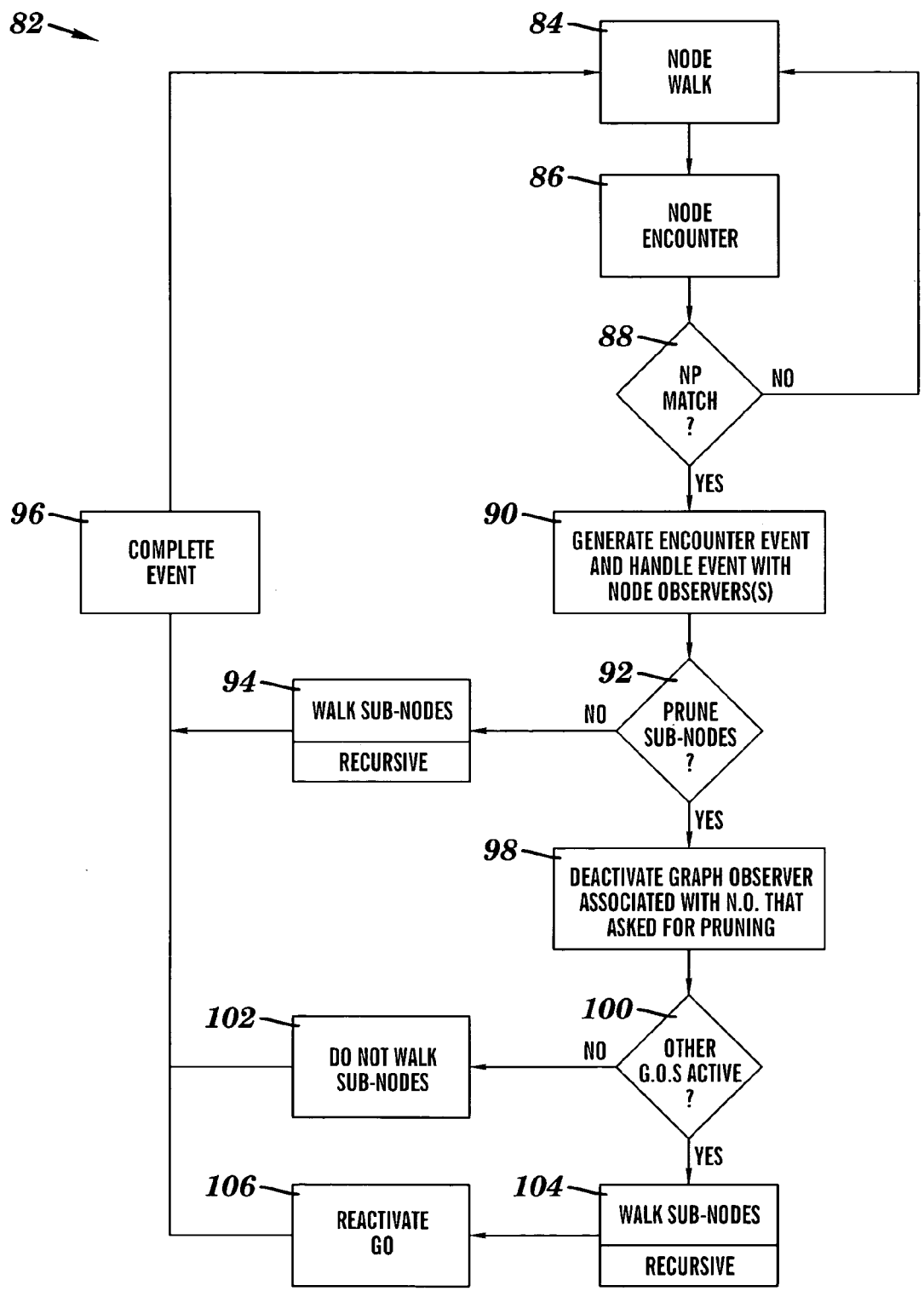
FIG. 4 depicts a flow diagram of a graph walking method in accordance with the present invention.

Referring now to FIG. 4, a method flow chart 82 that describes the walking of a node is depicted. First, a node walk 84 is initiated until a node encounter 86 occurs. At that point, the node is compared to one or more node patterns associated with any active graph observers to determine if there is a match 88. If there is no match, the node walk 84 continues. If there is a match, an encounter event is generated and the event is handled with one or more node observers 90. The node observers then determine if sub-nodes of the encountered node should be pruned 92. If no pruning is required, then the sub-nodes are walked 94, the event is completed 96, and node walk continues 84. Note that the walking of the sub-nodes 94 is done recursively using the logic beginning at node walk 84.

If pruning is required, the graph observer associated with the node observer that asked for pruning is deactivated 98. Next, it is determined if other graph observers are active 100. If no other graph observers are active the sub-nodes are not walked 102, the event is completed 96, and the node walking continues 84. If there are other graph observers that are active, then the sub-nodes are walked 104. Walking of sub-nodes 104 is likewise done in a recursive manner using the logic beginning at node walk 84. When the sub-node walking is complete, the graph observer is reactivated 106, the event is completed 96, and node walking continues 84.

It is understood that the components of the present invention can be realized in hardware, software, or a combination of hardware and software. Any kind of computer system or other apparatus adapted for carrying out the methods described herein is suited. A typical combination of hardware and software could be a general purpose computer system with a computer program that, when loaded and executed, carries out the methods described herein. Alternatively, a specific use computer, containing specialized hardware for carrying out one or more of the functional tasks of the invention could be utilized. Aspects of the present invention can also be embedded in a computer program product, which comprises all the features enabling the implementation of the methods described herein, and which when loaded in a computer system is able to carry out these methods. Computer program, software program, program, module, mechanism or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer implemented graph walking system, comprising:
   a processor; and
   a memory, including a program executable by the processor, the program including:
   a binding system to bind a graph observer to find matching node patterns with a directed non-cyclic graph, to bind node patterns that identify distinguishing node attributes of data of a node to node observers that at least one of analyze and process a particular node to generate at least one node pairing, and to bind the graph observer to at least one node pattern-node observer pairing;
   graph walking logic to systematically walk through nodes within the directed non-cyclic graph;
   a pattern testing system to determine if an attribute of an encountered node matches one of the node patterns;
   an event manager to generate an encountered event when one of the node observers is bound to a matching node pattern; and
   a pruning system to deactivate the graph observer with respect to sub-nodes of the encountered node without deleting the sub-nodes if a bound node observer determines that there is no interest in the sub-nodes.

2. The graph walking system of claim 1, wherein the encountered event is handled by the bound node observer.

3. The graph walking system of claim 1, wherein the graph walking logic walks through the graph in a top down hierarchal manner.

4. The graph walking system of claim 1, wherein the pruning system reactivates a deactivated graph observer after the sub-nodes of the encountered node have been walked.

5. The graph walking system of claim 1, wherein the event manager generates a completed event for each node observer that received an encountered event and that did not cause the graph observer to become deactivated.

6. The graph walking system of claim 5, wherein the completed event causes the graph walking logic to repeat the walk through the sub-nodes.

7. The graph walking system of claim 1, wherein the pruning system further causes the graph walking logic to bypass walking of the sub-nodes if the graph observer has been deactivated and no other active graph observers exist.

8. A computer implemented system for analyzing a directed non-cyclic graph of hierarchical data, comprising:
   a processor; and
   a memory, including a program executable by the processor, the program including:
   a system to bind a plurality of graph observers to find matching node patterns to a directed non-cyclic graph, wherein each graph observer is further bound to a set of node patterns that identify distinguishing node attributes of data of a node and a set of node observers that at least one of analyze and process a particular node;
   graph walking logic to systematically walk through nodes within the graph;
   a first pruning system that is instructed by a node observer bound with an associated graph observer to deactivate the associated graph observer until a set of sub-nodes for the encountered node has been walked; and
   a second pruning system that instructs the graph walking logic not to walk the set of sub-nodes for the encountered node without deleting the set of sub-nodes.

9. The system of claim 8, wherein the second pruning system causes the set of sub-nodes not to be walked only if all of the plurality of graph observers have been deactivated.

10. The system of claim 8, further comprising a pattern testing system for determining if the encountered node matches one of the node patterns.

11. The system of claim 8, further comprising an event manager for generating an encountered event when one of the node observers is bound to a matching node pattern.

12. A computer implemented method for analyzing a directed non-cyclic graph of hierarchical data, comprising the steps of:
   binding a plurality of graph observers to find matching node patterns to a directed non-cyclic graph, wherein each graph observer is further bound to a set of node patterns that identify distinguishing node attributes of data of a node and a set of node observers that at least one of analyze and process a particular node;
   systematically walking through nodes within the graph;
   generating an encounter event and handling the encounter event with a bound node observer when one of the node patterns matches an attribute of an encountered node;

deactivating the graph observer associated with the bound node observer if the bound node observer determines that a set of sub-nodes of the encountered node is to be pruned; and bypassing the walking of the set of sub-nodes without deleting the set of sub-nodes if all of the plurality of graph observers have been deactivated.

13. The method of claim 12, comprising the further step of generating a completed event for each node observer that received an encountered event and that did not cause the graph observer to become deactivated.

14. The method of claim 12, comprising the further step of reactivating the graph observer associated with the bound node observer after the set of sub-nodes of the encountered node have been walked.

15. The method of claim 12, comprising the further step of reactivating the graph observer associated with the bound node observer after set of sub-nodes of the encountered node have been bypassed.

16. The method of claim 12, comprising the further step of walking the sub-nodes if at least one graph observer is active.

17. A computer program product stored on a recordable medium, which when executed, analyzes a directed non-cyclical graph of hierarchical data, the program product comprising:

program code configured to bind a plurality of tree observers to find matching node patterns to a graph, wherein each graph observer is further bound to a set of node patterns that identify distinguishing node attributes of data of a node and a set of node observers that at least one of analyze and process a particular node;

program code configured to provide graph walking logic for systematically walking through nodes within the graph;

program code configured to provide a first pruning system that is instructed by a node observer bound with an associated graph observer to deactivate the associated graph observer until a set of sub-nodes for an encountered node has been walked; and program code configured to provide a second pruning system that instructs the graph walking logic not to walk the set of sub-nodes for the encountered node without deleting the set of sub-nodes.

18. The program product claim 17, wherein the second pruning system causes the set of sub-nodes not to be walked only if all of the plurality of graph observers have been deactivated.

19. The program product claim 17, further comprising program code configured to provide a pattern testing system for determining if the encountered node matches one of the node patterns.

20. The program product claim 17, further comprising program code configured to provide an event manager for generating an encountered event when one of the node observers is bound to a matching node pattern.

* * * * *